United States Patent [19]
Willingham

[11] Patent Number: 6,138,722
[45] Date of Patent: Oct. 31, 2000

[54] PORTABLE APPARATUS FOR RECONDITIONING MOTOR VEHICLE FLUIDS

[76] Inventor: Darryl B. Willingham, P.O. Box 4635, Long Beach, Calif. 90804

[21] Appl. No.: 09/268,357

[22] Filed: Mar. 15, 1999

[51] Int. Cl.[7] .................................................. F16N 33/00
[52] U.S. Cl. .............................................. 141/98; 184/1.5
[58] Field of Search ................................... 141/98; 184/1.5

[56] References Cited

U.S. PATENT DOCUMENTS

| | | | |
|---|---|---|---|
| 3,699,781 | 10/1972 | Taylor | 62/474 |
| 5,062,500 | 11/1991 | Miller et al. | 184/106 |
| 5,074,380 | 12/1991 | Bedi et al. | 184/1.5 |
| 5,174,902 | 12/1992 | Shubert et al. | 210/662 |
| 5,225,081 | 7/1993 | Brownawell | 210/690 |
| 5,417,851 | 5/1995 | Yee | 210/167 |
| 5,622,630 | 4/1997 | Romano | 210/683 |
| 5,885,940 | 3/1999 | Sumimoto | 508/111 |
| 5,900,155 | 5/1999 | Bedi | 210/739 |

*Primary Examiner*—J. Casimer Jacyna
*Attorney, Agent, or Firm*—Chris Papageorge

[57] ABSTRACT

An apparatus for reconditioning transmission fluid and motor oil is mounted on a cart for portability. The apparatus has a pump and a single hose with two passageways which allow the fluid to be both extracted from the vehicle and delivered back thereinto. One of the passageways allows transmission of fluid out of the vehicle, through the pump and into a reconditioning unit. The other passageway allows transmission of fluid out of the reconditioning unit and into the vehicle after the reconditioning unit has removed particulates and other contaminants from the fluid. The reconditioning unit includes a cellulose filter element in which is embedded activated charcoal located at a medial portion thereof.

23 Claims, 7 Drawing Sheets

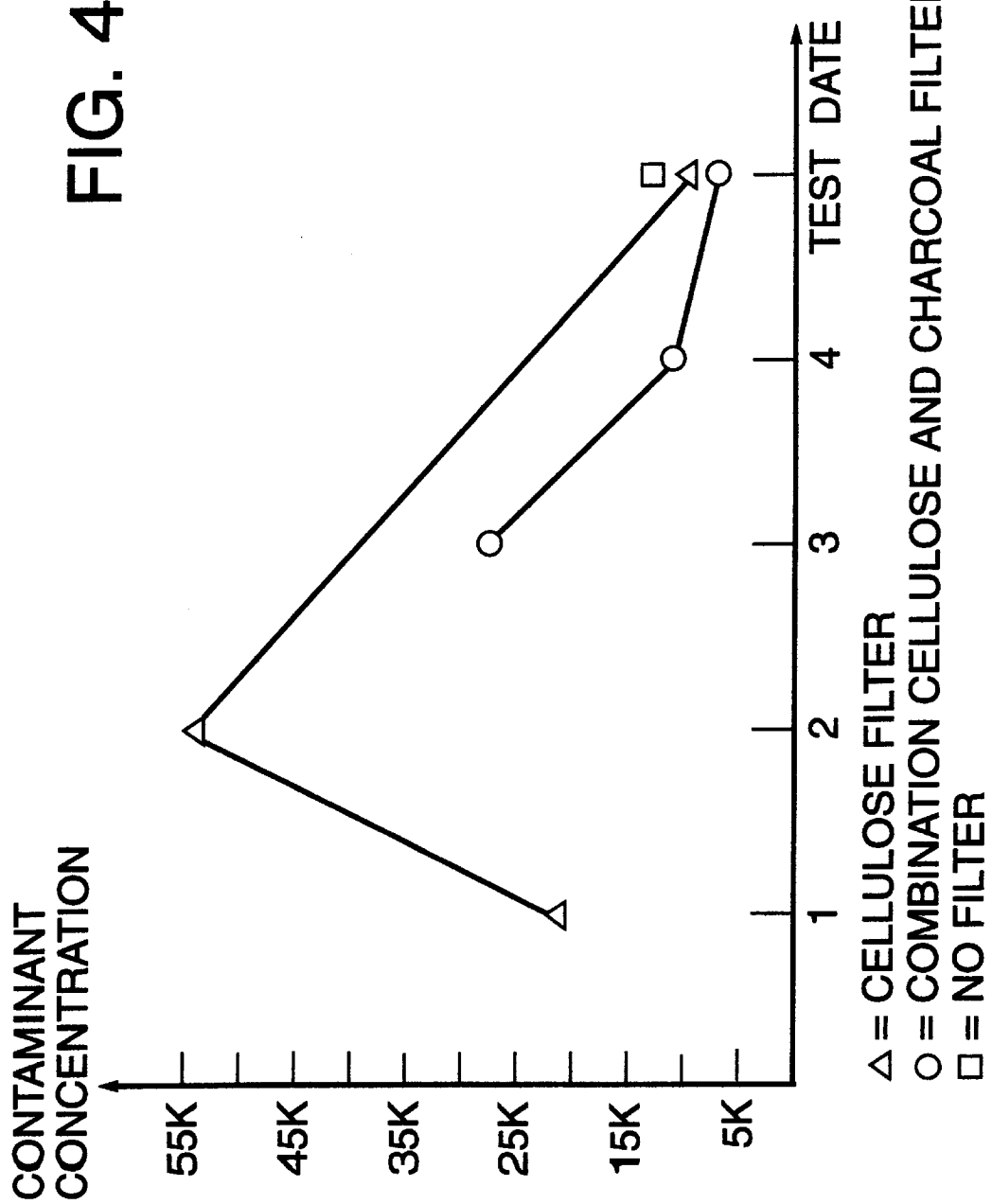

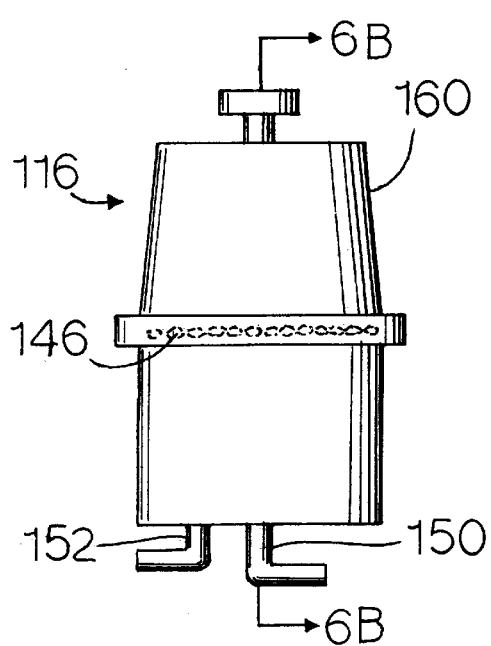
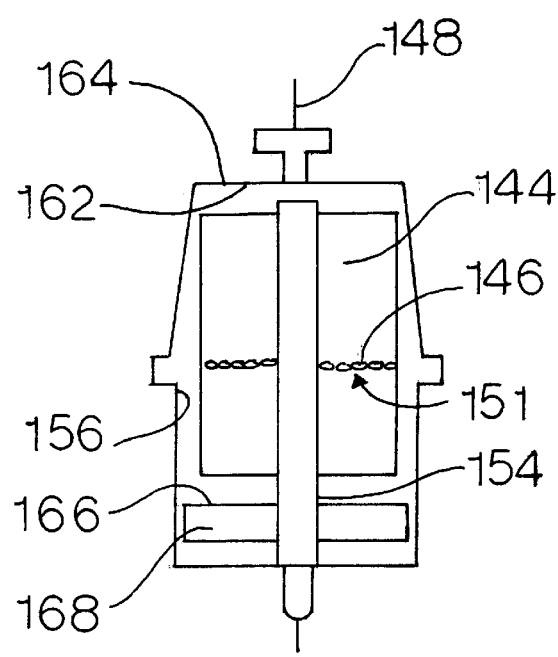
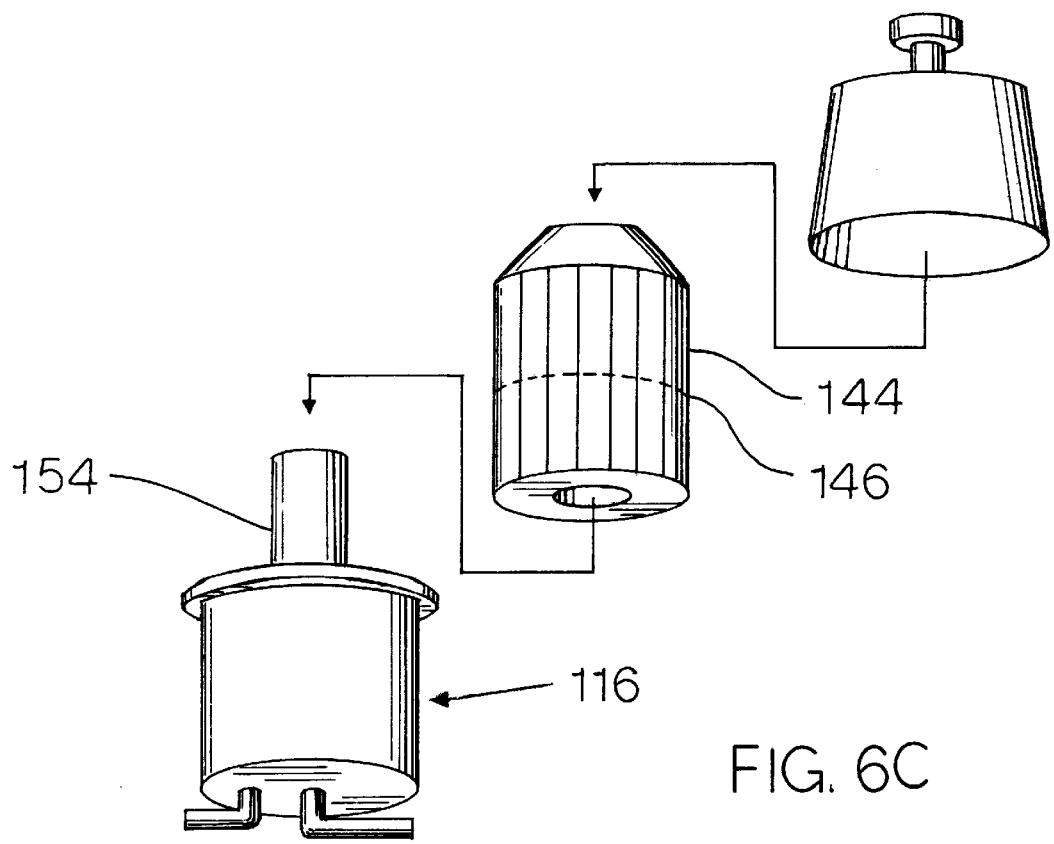
FIG. 6A
FIG. 6B
FIG. 6C

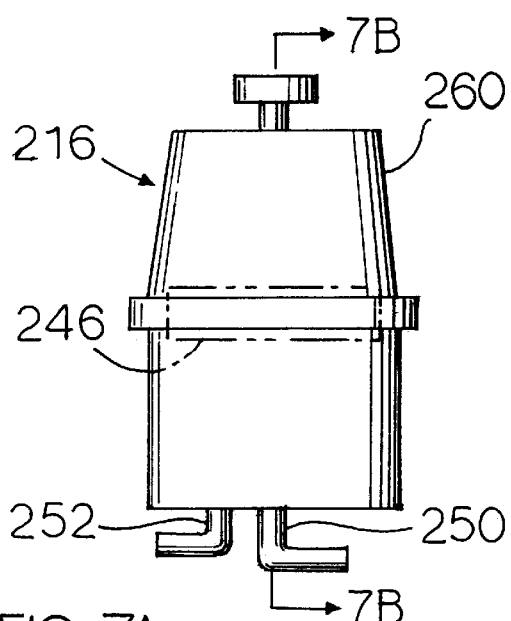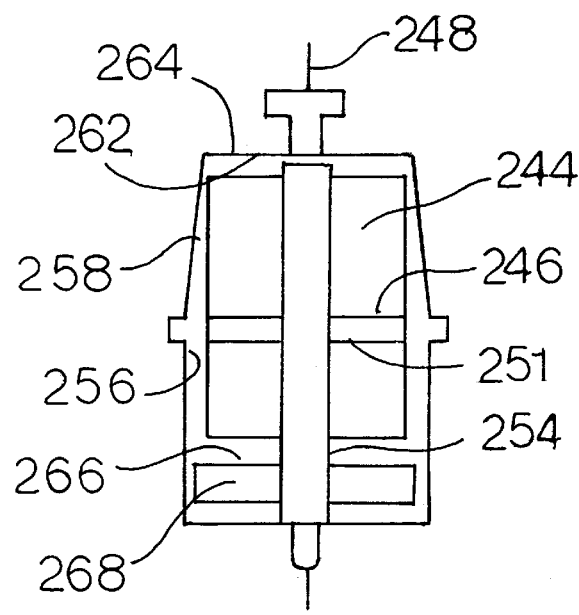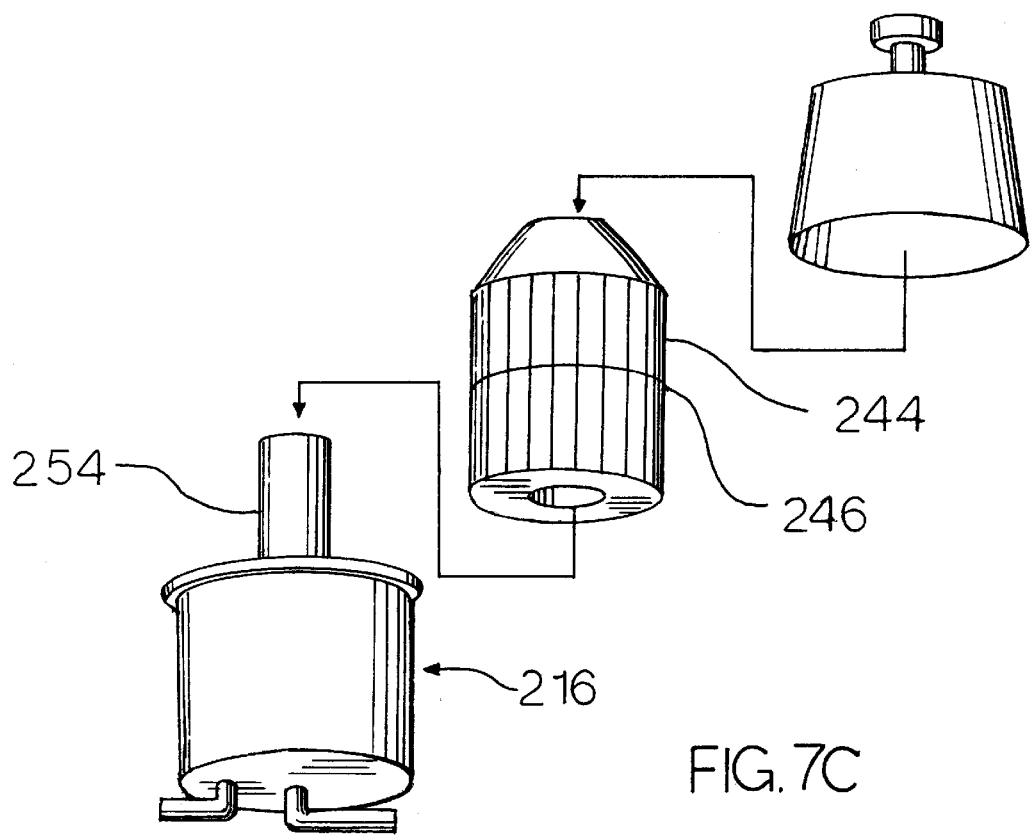

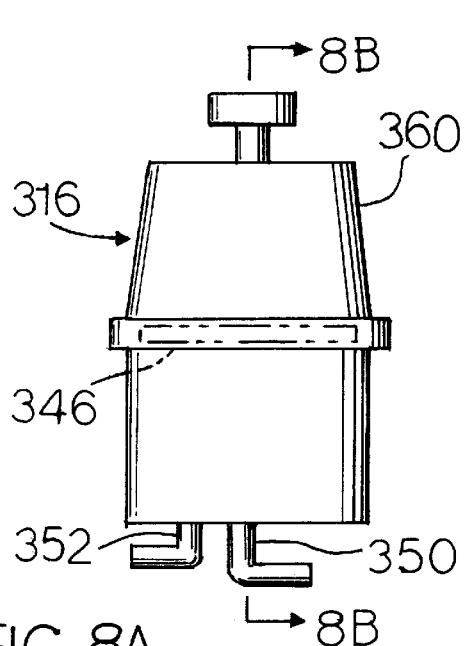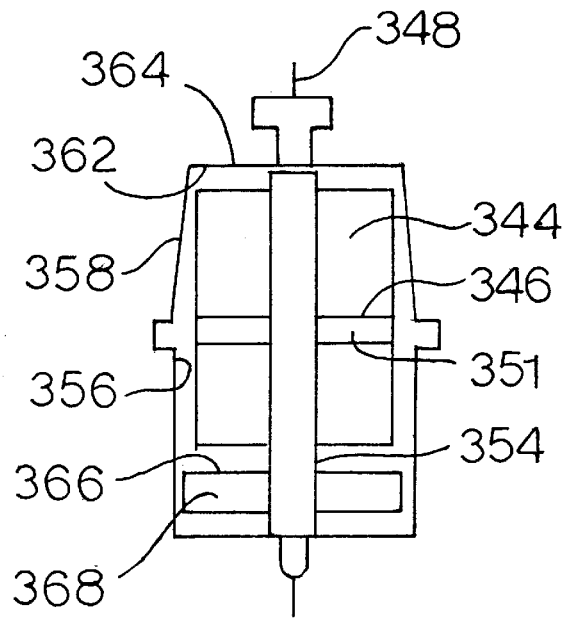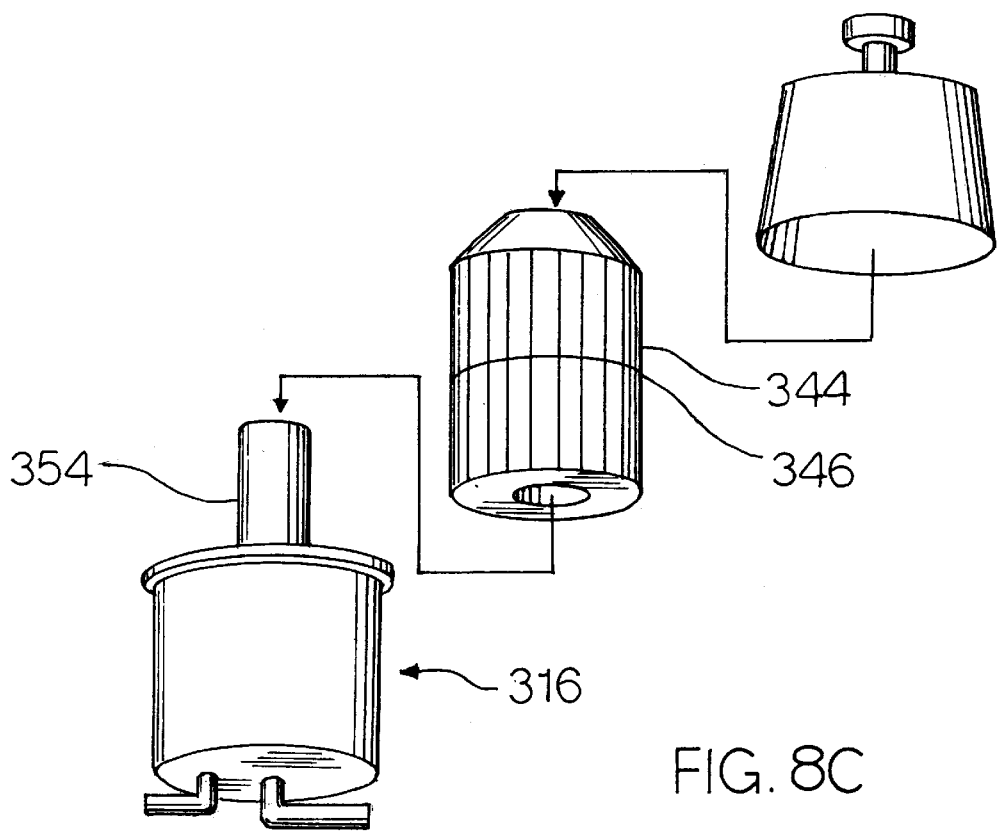

PORTABLE APPARATUS FOR RECONDITIONING MOTOR VEHICLE FLUIDS

BACKGROUND OF THE INVENTION

The present invention relates to an apparatus for reconditioning used motor oil and used transmission fluid in a motor vehicle and, more particularly, to such an apparatus which extracts the fluid or oil from the drivetrain components of a vehicle, delivers it to a reconditioning unit which removes contaminants therefrom and discharges the fluid or oil directly (back) into the vehicle for reuse thereby.

Automobile manufacturers and automotive experts advise motor vehicle owners that frequent oil changes i.e., approximately every few thousand miles, is one of the best ways to assure that the vehicle's engine lasts a long time with minimal repairs. However, changing the motor oil of a motor vehicle is typically a messy and troublesome job for a motor vehicle owner. The oil change job requires the owner to remove the crankcase drain plug which typically entails the owner crawling under the vehicle into a typically cramped area where he may come into contact with the vehicle underside which is covered with road dirt, grime, grease and oil all of which are likely to get on his clothing, skin, eyes, etc. The oil change job is also time consuming because the oil takes a long time to drain completely out of the crankcase. In addition, it takes a long time to pour the oil into the engine through the oil filler a quart at a time with every quart container completely emptied out. In addition to these undesireable aspects of this job, after the job is over there remains the question of what to do with the used oil. Frequently, the oil pan into which the oil has drained is unsuitable for transporting the oil to a recycling center. Consequently, the used oil must be transferred to another container, and this may be messy and time consuming as well as generally a hassle. Also, transporting the used oil to the recycling center not only adds to the time cost for the job but may also involve spillage onto the trunk floor or onto the transporter's clothing. The only other alternative to this is getting the oil change performed at an oil change center, but this may require that the owner sit in the car and wait in line for the vehicle to be taken care of. In addition, the owner must drive to the oil change center which may be a long distance from the owner or be open for business at inconvenient hours. Thus, changing the oil is a maintenance job that is undesirable for both the do-it-yourself owner as well as the owner who pays another to do the job.

Automobile manufacturers and automotive experts also advise that changing the transmission fluid regularly will substantially prolong the useful life of the transmission. However, most automobile owners skimp on this job because automatic transmissions lack a drain plug which requires that the oil pan be detached and because they do not believe that changing the fluid of a transmission is important. In addition, changing the fluid of an automatic transmission is not very effective because there typically is no effective way to drain the fluid out of the torque converter with the result that a substantial amount of contaminated fluid remains in the transmission even after a fluid change. Consequently, there is not a great deal of benefit to be derived from changing the transmission fluid. Although manual transmissions have a drain plug, the oil drain plug is usually somewhat inaccessible and filling the transmission requires special equipment or fittings making changing the oil frequently messy and time consuming.

There have been numerous devices and systems which have been designed to expedite the job of changing the oil of a motor vehicle. Two examples of such systems are disclosed in U.S. Pat. No. 4,384,660 to Bedi and U.S. Pat. No. 5,476,154 to Sage. The Bedi system provides a high speed oil change and additionally flushes the used oil out of the oil pan. Both the Bedi and the Sage systems require that a special tube and coupling be attached to the oil pan. The Bedi system has both fill and drain hoses and also flushes the oil pan with a solvent for cleaning thereof and is very effective in draining and flushing the crankcase of used oil and filling it with new oil. But, these systems are not applicable to motor vehicle transmissions. Both the Bedi and the Sage systems have an important disadvantage which is that the requirement of special coupling and tube requires permanent or semi-permanent modification of the engine. Thus, these systems cannot be used on any motor vehicle but instead must be used only on those that have been specially modified.

Other systems have been designed to recycle the used motor oil. An example of such a system is disclosed in U.S. Pat. No. 5,554,278 to Henderson. The Henderson system removes used oil from the vehicle oil pan and filters out particulates and pumps the oil into the fuel where it is mixed therewith. The oil is filtered only to prevent clogging of the fuel filters or the fuel injector nozzles etc. and not to make the oil reusable as a lubricant. The Henderson system requires a special three-way valve attached to the filter hose. Essentially, the purpose of the Henderson system is to burn used oil. In addition, this system requires that a valve be inserted into the drain plug opening for removal of used oil from the oil pan. A primary disadvantage of the Henderson system is that it requires that new oil be put into the motor and does not recondition the oil for reuse in the motor.

Other oil change systems have been designed for portability. An example of such a system is disclosed in U.S. Pat. No. 2,552,749 to Tabet. The Tabet system has a tube which is inserted into the measuring stick opening of the motor and the motor oil is pumped out therethrough. New oil is put into the motor via other means. The Tabet system is also mounted on wheels to enable it to be quickly moved to any vehicle and thereby enable it to quickly take care of many motor vehicles. However, a primary disadvantage of the Tabet system is that it does not allow new oil to be put into the motor via the measuring stick opening and is thus not generally expeditious.

Thus, what is needed is an apparatus that is capable of quickly draining and refilling motor vehicle drivetrain fluids including motor oil and transmission fluid effectively and efficiently without the necessity of modifying the motor vehicle. What is also needed is such an apparatus that reconditions the used fluid thereby rendering it suitable for reuse. In addition, what is need is such an apparatus that pumps the reconditioned fluid directly into the vehicle immediately after it is reconditioned.

SUMMARY OF THE INVENTION

It is a principal object of the present invention to provide an apparatus that reconditions the drivetrain units fluids of a motor vehicle.

It is also an object of the present invention to provide an apparatus that reconditions the drivetrain units fluids of a motor vehicle and puts the fluids back into the vehicle for reuse thereby.

It is an object of the present invention to provide an apparatus for reconditioning motor vehicle fluids that is portable enabling it to be moved to the site of the vehicle thereby enhancing ease of use and convenience.

It is an object of the present invention to provide an apparatus for reconditioning motor vehicle fluids which both extracts and discharges the fluid via the dipstick tube.

It is also an object of the present invention to provide an apparatus for reconditioning motor vehicle fluids which is capable of completely draining and reconditioning all the fluid of the motor vehicle transmission.

It is still another object of the present invention to provide an apparatus for reconditioning motor vehicle fluids which does not require any modification of the motor vehicle in order to perform its desired function.

It is another object of the present invention to provide an apparatus for reconditioning motor vehicle fluids which is simple in construction with minimal moving parts in order to provide long operational life and trouble free performance.

It is an object of the present invention to provide an apparatus for reconditioning motor vehicle fluids which is simple and easy to use.

Essentially, the reconditioning apparatus of the present invention achieves its goal of removing and refilling the motor vehicle with reconditioned motor or transmission fluid by pressurizing and passing the fluid extracted from the vehicle through a special filter from which it is reintroduced into the vehicle. The special filter removes abrasive particles of iron, aluminum, copper and of various other metals and also removes corrosive compounds such as sulfuric acid. The present invention incorporates a pump which is used to both extract the fluid from the crankcase or transmission case (or other such fluid container of the vehicle), pressurize and pass it through the filter and discharge it back into the container. Either a pair of tubes or a single tube having a pair of passageways therein are utilized to transmit the fluid into and out of the fluid container. The tubes are inserted into the dipstick tube after the dipstick is removed therefrom. The orifice of the tube which extracts fluid from the container is preferably inserted deep into the body of fluid while the orifice of the tube which discharges fluid into the container is inserted so that it is out of the body of fluid and well above the orifice of the other tube. Situating the orifices of the tubes at different locations prevents the extracting tube from picking up fluid which has just been discharged from the discharge tube and thereby prevents the apparatus from simply extracting and reconditioning the same fluid that has just been discharged into the container after being reconditioned by the apparatus.

By simply reconditioning the used fluid rather than changing the fluid, the present invention saves time and labor by obviating the need for the user to get under the vehicle to remove and later reinstall the drain plug of the engine crankcase or of the manual transmission or the pan of the automatic transmission. There is also no need for the user to remove and reinstall a filler cap. Consequently, the labor required in using these prior art methods is saved by the present invention. In addition, there is no need to transport used oil with the attendant risk of spillage. Also, the apparatus of the invention saves on the cost of new oil or transmission fluid. Thus, the job of reconditioning the fluid is performed much more quickly and requires much less labor than alternative prior art fluid change methods.

The apparatus of the invention is also capable of extracting and reconditioning the fluid of an automatic transmission or engine and putting it back into the transmission or engine while the engine is running. This capability enables the task to be performed much more quickly because the fluid circulation provided by a running engine enables the fluid to be completely extracted more quickly. Another important advantage of this feature is that since the engine operation drives the transmission pump resulting in transmission fluid circulation throughout the entire transmission including the torque converter, this feature allows the apparatus to extract all the fluid in the torque converter as well as the rest of the transmission. In contrast, conventional transmission fluid change methods and systems cannot access and therefore cannot remove the fluid in the torque converter thereby resulting in the contaminated fluid in the torque converter contaminating the new fluid when the engine is run. Thus, the apparatus of the invention accomplishes a desired task which cannot pragmatically be accomplished by conventional prior art systems.

An important feature of the invention is that it performs its task without producing a mess and without requiring any clean up during or after the task is done. In contrast to prior art systems which require removal of certain engine or transmission components so that the fluid can be drained out and new fluid poured in, the apparatus of the present invention extracts and discharges the fluid into the vehicle container by use of a single attachment which can be quickly and easily plugged into and removed from the dipstick tube. The entire task of reconditioning the fluid in the container of the vehicle is accomplished while the attachment is in the dipstick tube, and, except for removal of the dipstick, no detachment or removal of vehicle components is needed to accomplish the reconditioning task. Consequently, there is no need to unscrew or detach greasy, dirty or oily vehicle plugs etc. and thus little likelihood that the user will get his hands or clothing dirty. There is also neither fluid drainage nor fluid pouring required and therefore no likelihood of fluid spilling or dripping on something and causing a stain or a mess. The invention also enables the user to be able to quickly recondition the used motor oil of a variety of motor vehicles and obviates the need for a used oil container for transporting the oil to a recycling center as well as the need for removing and reinstalling the drain plug and filler cap thereby minimizing the labor involved. Consequently, since there is little likelihood that the user's clothing, person or delicate parts of the vehicle will be stained by fluid spillage, dripping fluid or by contact with oily or greasy plugs, screws or other components of the vehicle, the apparatus requires only minimal cleanup.

The apparatus is suitable and ready for use on any of a variety of vehicles due to its self contained, stand alone feature. In contrast, some prior art fluid change systems require modification of the vehicle's oil pan or oil filter housing or attachment of a special fitting. The apparatus only requires that the vehicle have a dipstick tube of suitable inside diameter to accommodate the discharge and/or suction tube of the apparatus. Thus, the apparatus is ready to perform the reconditioning task when it is positioned adjacent the vehicle and without any modification to the vehicle components.

BRIEF DESCRIPTION OF THE DRAWINGS

FIG. 4 is a graphical representation showing the progressive improvement in contaminant concentration in a sample motor vehicle engine crankcase and illustrating the superior performance of the cellulose and activated charcoal combination filter over a simple cellulose filter.

FIG. 6A is a side view of a second embodiment of the apparatus of the invention showing a layer of charcoal pellets located in a medial portion of the filter.

FIG. 6B is a sectional view of the filter of the second embodiment taken along lines 6B—6B of FIG. 6A.

FIG. 6C is an exploded view of the filter of the second embodiment.

FIG. 7A is a side view of a third embodiment of the apparatus of the invention showing a disc shaped charcoal filter element located in a medial portion of the filter.

FIG. 7B is a sectional view of the filter of the third embodiment taken along lines 7B—7B of FIG. 7A.

FIG. 7C is an exploded view of the filter of the third embodiment.

FIB. 8A is a side view of a fourth embodiment of the apparatus of the invention showing a disc shaped charcoal mesh filter element located in a medial portion of the filter.

FIG. 8B is a sectional view of the filter of the fourth embodiment taken along lines 8B—8B of FIG. 8A.

FIG. 8C is an exploded view of the filter of the fourth embodiment.

DETAILED DESCRIPTION OF THE PREFERRED EMBODIMENT

Figure 1:
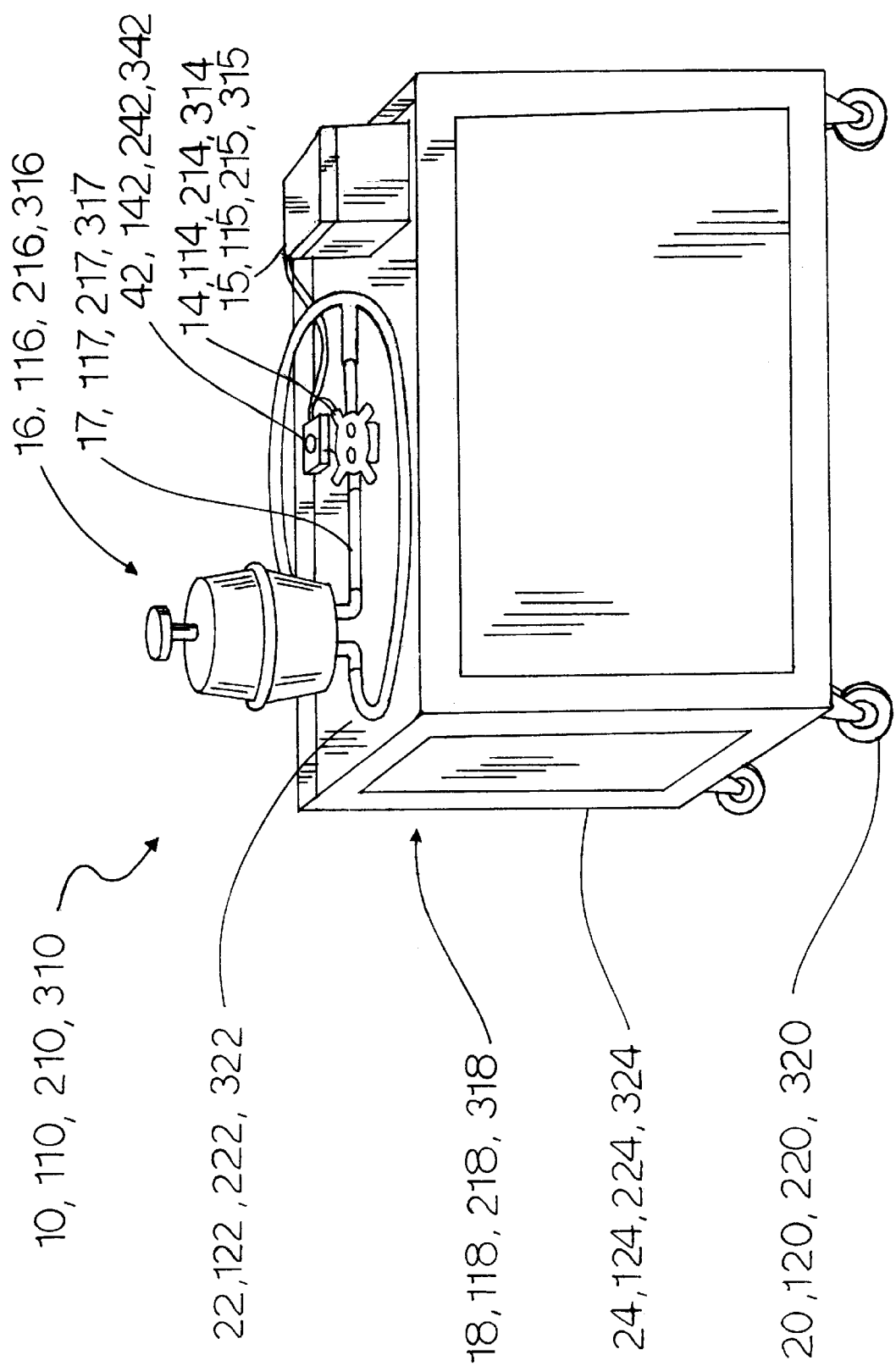
FIG. 1 is a perspective view of the invention showing the pump and filter mounted on a mobile cart.

Referring to the drawings, FIG. 1 shows the first, second, third and fourth embodiments of the reconditioning apparatus of the invention generally designated by the numerals, 10, 110, 210 and 310, respectively. FIG. 1 depicts the structures of the invention which are common to all the embodiments. All the embodiments of the invention include a hose 12, 112, 212 and 312 and a pump 14, 114, 214 and 314 as well as a filter 16, 116, 216 and 316. An interconnect 17, 117, 217 and 317 is also included for providing fluid communication between the pump 14, 114, 214 and 314 and the filter unit 16, 116, 216 and 316. The pump 14, 114, 214 and 314 is preferably electric and preferably simply plugged into a suitable electrical outlet (not shown) or alternatively powered by connection to a battery 15, 115, 215 and 315. All the embodiments also preferably include a cart 18, 118, 218 and 318 which is provided with a set of wheels 20, 120, 220 and 320 for providing mobility thereto. The cart 18, 118, 218 and 318 also includes a support surface 22, 122, 222 and 322 on which the pump 14, 114, 214 and 314 and filter 16, 116, 216 and 316 are mounted and a frame 24, 124, 224 and 324. Use of the cart 18, 118, 218 and 318 enables the apparatus 10, 110, 210 and 310 to be manually moved easily from one work station to another and also thereby permits it to attend to many vehicles which are clustered together in a garage or lot thereby facilitating and streamlining the process of reconditioning the drive train fluids of multiple vehicles.

Figure 3:
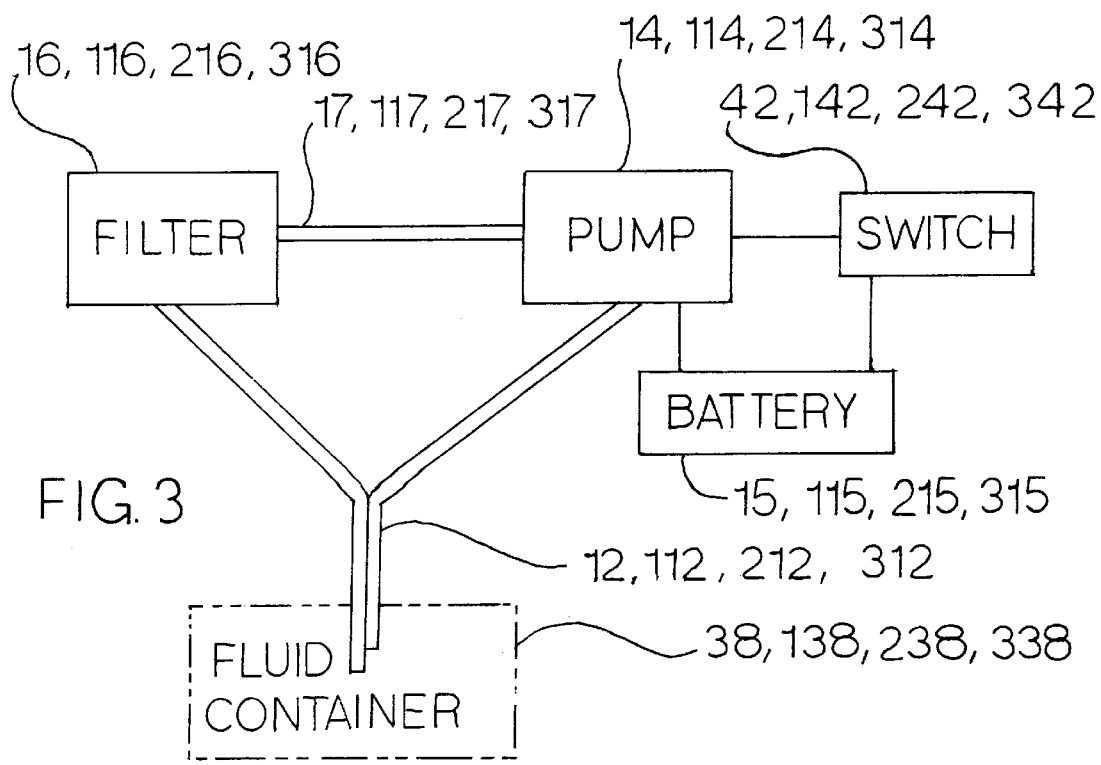
FIG. 3 is a block diagram of the main components of the apparatus of the invention.

FIG. 3 shows a block diagram illustrating the pump, filter and hose utilized in the present invention. The pump 14, 114, 214 and 314 is connected to the hose 12, 112, 212 and 312 which is in turn inserted in the dipstick tube 28, 128, 228 and 328 of the drive train unit which may be, for example, an automatic transmission or engine. The pump 14, 114, 214 and 314 extracts the fluid out of the drive train unit through the hose and transmits it to the filter 16, 116, 216 and 316 which removes the contaminants therefrom. The contaminants include particulates such as aluminum, iron and copper as well as sulfuric acid. The filter (or reconditioning unit) 16, 116, 216 and 316 is preferably capable of removing more than ninety percent of the abrasive and metallic and non-metallic particles that cause premature component wear and capable of removing such particles that are as small as five microns. Pressurization of the fluid via the pump 14, 114, 214 and 314 causes it to quickly pass through the filter and also propels it in a reconditioned state into the hose and delivers it back into the drive train unit. With the engine running, the fluid is circulating through the drivetrain unit and this makes the entire fluid therein more accessible to the hose 12, 112, 212 and 312 and thereby expedites the reconditioning process.

Figure 2:
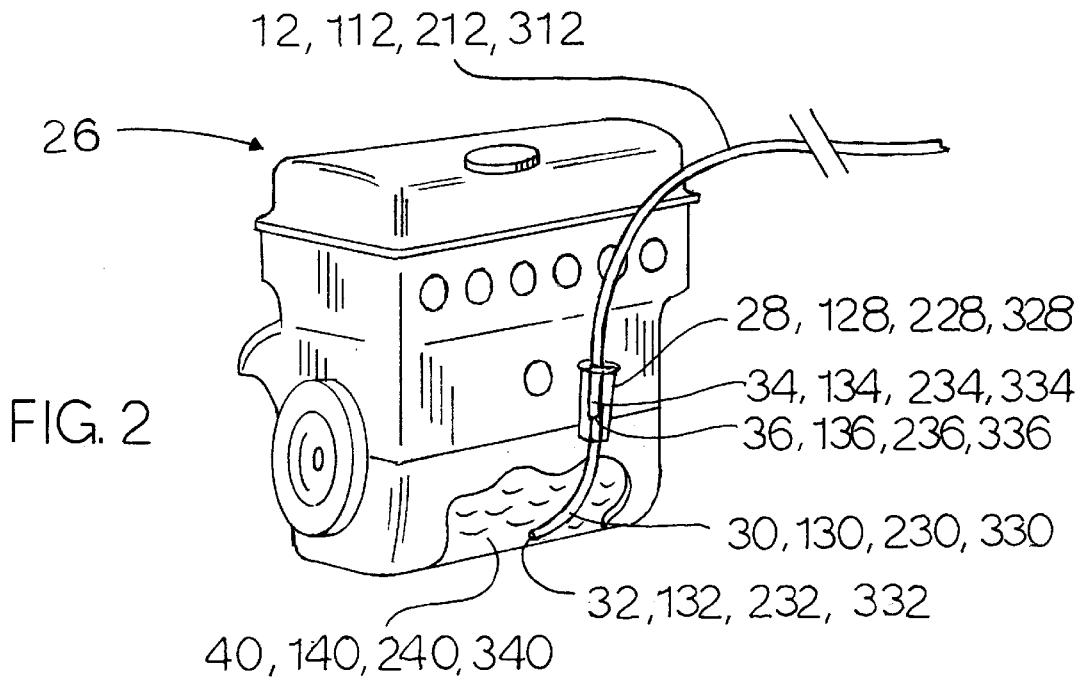
FIG. 2 is a perspective view of components of the apparatus of the invention showing the discharge and suction tubes thereof inserted in the dipstick tube of an automobile engine (shown in phantom) and illustrating the suction tube orifice positioned within the fluid in the engine crankcase and the discharge tube orifice outside the fluid.

Preparatory to performing the desired reconditioning operation, the apparatus 10, 110, 210 and 310 is simply manually pushed or pulled into a desired position in which it is adjacent to a subject motor vehicle. If it is desired to recondition the motor oil of the vehicle, the dipstick of the engine 26 of the vehicle is removed and the hose 12, 112, 212 and 312 is inserted in the dipstick tube 28, as shown in FIG. 2. The hose 12, 112, 212 and 312 is preferably bifurcated so that it comprises a pair of tubes and thus contains two passageways for the fluid to pass through. The pair of tubes are suction (or extraction) tube 30, 130, 230 and 330 having a suction (or extraction) tube orifice 32, 132, 232 and 332 and a discharge tube 34, 134, 234 and 334 having a discharge tube orifice 36, 136, 236 and 336. The suction tube is preferably approximately two feet longer than the discharge tube so that the suction tube orifice 32, 132, 232 and 332 extends deep into the body of fluid 40 of the engine crankcase 38 while the discharge tube orifice 36, 136, 236 and 336 is well outside of the body of fluid 40. This enables the pump 14, 114, 214 and 314 when switched on via switch 42, 142, 242 and 342 to draw the fluid out of one area of the crankcase 38 and expell the fluid into another area of the crankcase 38 thereby minimizing the likelihood that the pump will be extracting and expelling the same fluid out of and into the crankcase repeatedly. Preferably, this length differential and positioning enables the apparatus to extract fluid from deep within the body of fluid while discharging the reconditioned fluid onto the body of fluid. Thus, the different lengths of the tubes allow the apparatus to more effectively circulate all the fluid through the filter and thereby more effectively and expetitiously recondition all the fluid in the engine 26. Alternatively, however, instead of utilizing the bifurcated hose 12, 112, 212 and 312, the invention may utilize a pair of separate tubes.

FIG. 4 is a graph which shows the level of contaminant concentration in a motor vehicle engine over a period of time and the reduction in the level of contaminant concentration using the apparatus of the invention and comparing it to the reduction in the level of contaminant concentration using essentially the same apparatus of the invention except with a simple cellulose filter rather than the cellulose and activated charcoal combination filter of the invention. The contaminant levels are tested at intervals of ordinary motor vehicle and at five different dates. On the first two dates only the cellulose filter element was utilized for fluid reconditioning, while on the next two dates only the combination cellulose and charcoal filter was used. On the fifth date the test vehicle is initially tested for contaminants prior to fluid reconditioning which consists of first using the cellulose filter and subsequently using the combination cellulose and charcoal filter. The graph only shows the results for testing for total contaminant concentration of contaminants which include sulfur, iron, copper, chromium, lead, aluminum, silicon, sodium, molybdenum, tin and silver, and the concentration is measured in parts per billion. As can be seen from FIG. 4, the combination activated charcoal and cellulose filter element provides contaminant removal that exceeds that obtained from the cellulose filter alone. In addition, the use of the combination activated charcoal and cellulose filter element provides synergistic results over the results obtained from a simple activated charcoal filter element and from a simple cellulose filter element.

Figure 5A:
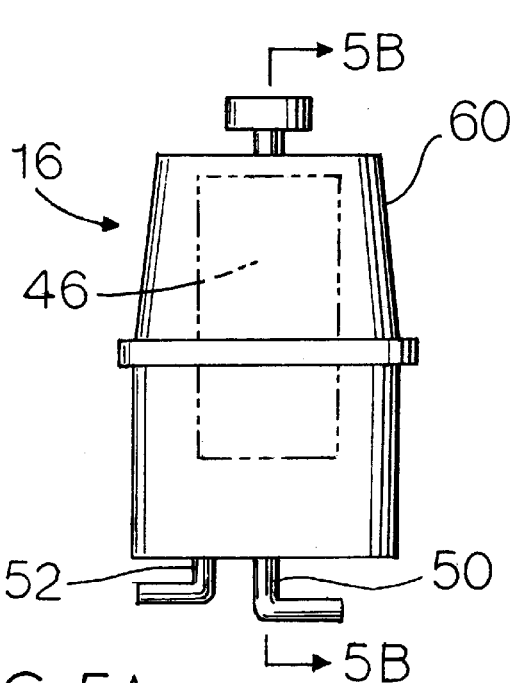
FIG. 5A is side view of a first embodiment of the apparatus of the invention showing a cylindrically shaped charcoal filter element located in a medial portion of the filter.
Figure 5B:
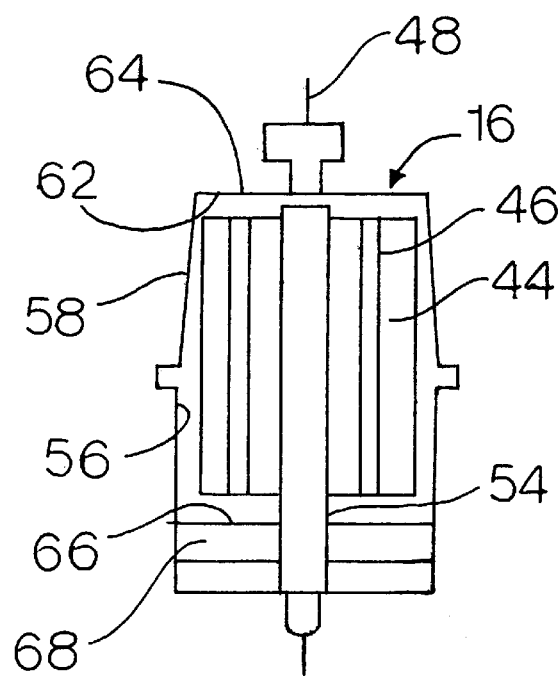
FIG. 5B is a sectional view of the filter of the first embodiment taken along lines 5B—5B of FIG. 5A.
Figure 5C:
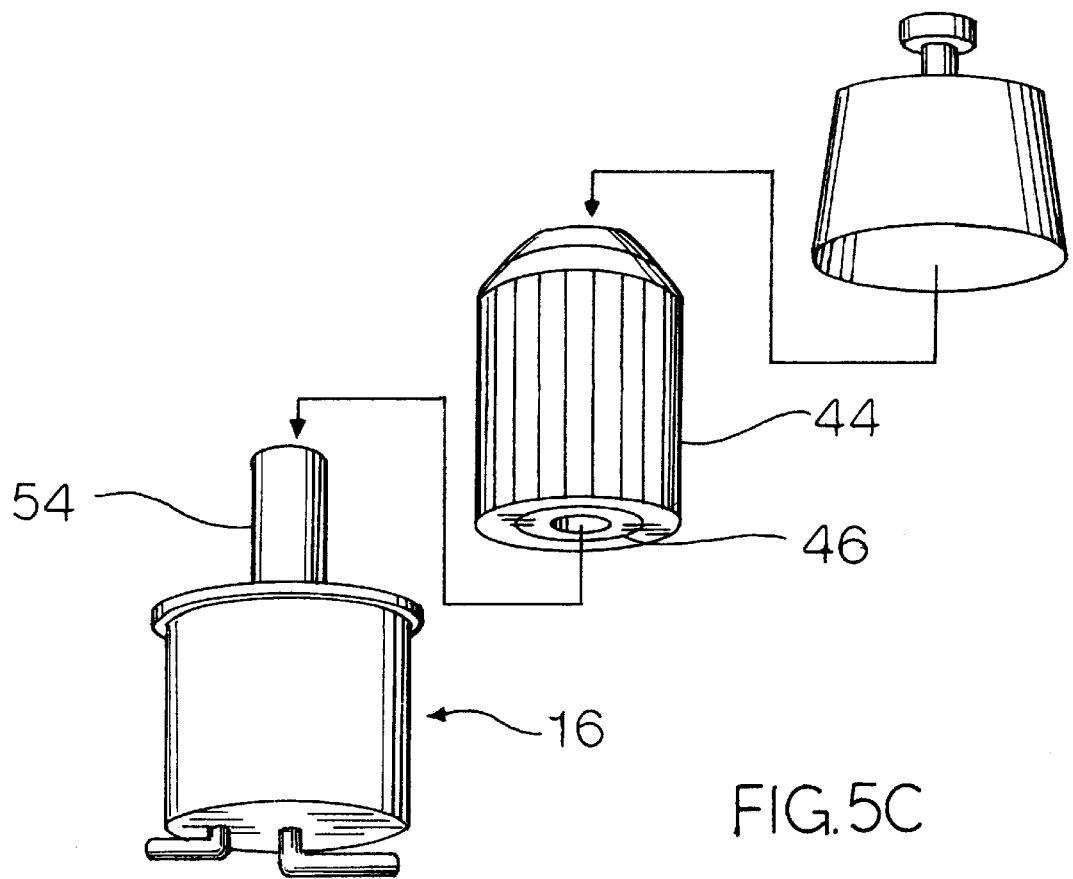
FIG. 5C is an exploded view of the filter of the first embodiment.

FIGS. 5A, 5B and 5C show a first embodiment of the invention designated by the numeral 10. Embodiment 10 has special filter component structures which include a cellulose filter element 44 and an activated charcoal filter element 46. The charcoal filter element 46 is preferably cylindrically shaped and is oriented so that it is longitudinally oriented relative to the axis 48 of the filter unit 16. The charcoal filter element 46 is also preferably medially positioned within the cellulose filter element 44 so that it is at a medial location between the centrally located tubular conduit 54 (through which the fluid enters the housing 160 and filter elements 144 and 146) and the inner surface 56 of the lateral wall 58 of the filter unit housing 60 and extends from the inner surface 66 of the top wall 64 of the housing 60 to the inner surface 66 of the bottom apertured plate 68 thereof. The cylindrical shape of the charcoal filter element 46 and its medial location allow the fluid extracted from the drivetrain unit 26 passing through the suction tube 30 and entering the filter unit 16 through the inlet 50 to pass through at least part of the cellulose filter element 44 and at least part of the charcoal filter element 46 and prior to exiting the filter unit 16 through the outlet 52. The fluid which is reconditioned by the filter unit 16 and discharged through the outlet 52 is pumped through the discharge tube 34 and expelled back into the crankcase 38 (or other drivetrain unit fluid container).

FIGS. 6A, 6B and 6C show a second embodiment 110 which differs from the first embodiment 10 only in the special filter component structures. The filter unit 116 preferably includes a cellulose filter element 144 and an activated charcoal filter element 146. However, unlike the first embodiment 10, charcoal filter element 146 comprises a plurality of charcoal pellets 149 which are disposed so that they form a layer 151 situated within and at a medial portion of the cellulose filter element 144. The layer 151 is oriented so that it is generally perpendicular to the axis 148 of the filter unit 116. In addition, the layer 151 extends from the inner surface 156 of the lateral wall 158 of the housing 160 to the tubular conduit 154. The layer 151 is also preferably medially positioned within the cellulose filter element 144 so that it is at a medial location between the inner surface 162 of the top wall 164 of the housing 160 to the inner surface 166 of the bottom apertured plate 168 thereof. The charcoal filter element is thus located so that it allows the fluid extracted from the drivetrain unit 126 and passing through the suction tube 130 and entering the filter unit 116 through the inlet 150 to pass through part of the cellulose filter element 144 prior to passing through the charcoal layer 151 and subsequently through another part of the cellulose filter element 144 prior to exiting the filter unit 116 through the outlet 152. As with embodiment 10, the fluid which is reconditioned by the filter unit 116 and discharged through the outlet 152 is pumped through the discharge tube 134 back into the crankcase 138 (or other drivetrain unit fluid container).

FIGS. 7A, 7B and 7C show a third embodiment 210 which differs from the first and second embodiments 10 and 110 only in the special filter component structures. As with embodiments 10 and 110, the filter unit 216 includes a cellulose filter element 244 and an activated charcoal filter element 246. However, unlike embodiments 10, 110, charcoal filter element 246 comprises a disc shaped layer 251 which is situated within and at a medial portion of the cellulose filter element 244. The disc shaped layer 251 is oriented so that it is generally perpendicular to the axis 248 of the filter unit 216. In addition, the layer 251 extends from the inner surface 256 of the lateral wall 258 of the housing 260 to the tubular conduit 254. The disc shaped layer 251 is preferably at the same location as the pellet layer 151 of embodiment 110, i.e., longitudinally midway between the inner surface 262 of the top wall 264 of the housing 260 and the inner surface 266 of the bottom apertured plate 268 of the housing 260. The disc shaped layer 251 preferably is thin relative to the cellulose filter element 244 such that it is preferably a film of activated charcoal approximately one-hundreth of an inch in thickness. As with embodiment 110, the charcoal filter element is located so that it allows the fluid extracted from the drivetrain unit 226 and passing through the suction tube 230 and entering the filter unit 216 through the inlet 250 to pass through part of the cellulose filter element 244 prior to passing though the charcoal layer 251 and subsequently through another part of the cellulose filter element 244 prior to exiting the filter unit 216 through the outlet 252. As with embodiments 10 and 110, the fluid which is reconditioned by the filter unit 216 and discharged through the outlet 252 is pumped through the discharge tube 234 back into the crankcase 238 (or other drivetrain unit fluid container).

FIGS. 8A, 8B and 8C show a fourth embodiment 310 which differs from the first, second and third embodiments 10, 110 and 210 only in the special filter component structures. As with embodiments 10, 110 and 210, the filter unit 316 includes a cellulose filter element 344 and an activated charcoal filter element 346. However, unlike embodiments 10, 110 and 210, charcoal filter element 346 comprises an activated charcoal layer 351 which is in the form of a mesh or screen which is situated within and at a medial portion of the cellulose filter element 344. The mesh layer 351 is oriented so that it is generally perpendicular to the axis 348 of the filter unit 316. In addition, the layer 351 extends from the inner surface 356 of the lateral wall 358 of the housing 360 to the tubular conduit 354. The mesh layer 351 is preferably at the same location as the pellet layer 151 of embodiment 110 and layer 251 of embodiment 210 i.e., longitudinally midway between the inner surface 362 of the top wall 364 of the housing 360 and the inner surface 366 of the bottom apertured plate 368 of the housing 360. The mesh layer 351 is preferably thin relative to the cellulose filter element 344 and is preferably of a thickness of approximately one-hundreth of an inch. As with embodiments 110 and 210, the charcoal filter element 346 is located so that it allows the fluid extracted from the drivetrain unit 326 and passing through the suction tube 330 and entering the filter unit 316 through the inlet 350 to pass through part of the cellulose filter element 344 prior to passing through the charcoal layer 351 and subsequently through another part of the cellulose filter element 344 prior to exiting the filter unit 316 through the outlet 352. As with embodiments 10, 110 and 210, the fluid which is reconditioned by the filter unit 316 and discharged through the outlet 352 is pumped through the discharge tube 334 back into the crankcase 338 (or other drivetrain unit fluid container).

The filter unit 16, 116, 216 and 316 is preferably composed of stainless steel although it may also be composed of other metals or suitable plastic material. In addition, the filter unit 16, 116, 216 and 316 is preferably approximately four inches in diameter and eight inches in height. Both the suction tube 30, 130, 230 and 330 and the discharge tube 34, 134, 234 and 334 have an inside diameter of approximately eight-hundreths of an inch and a wall thickness of approximately seven-hundreths of an inch. The hose 12, 112, 212 and 312 is also preferably composed of a flexible plastic material and is preferably six feet in total length.

Accordingly, there has been provided, in accordance with the invention, a motor vehicle drivetrain unit fluid reconditioning apparatus that fully satisfies the objectives set forth above, It is to be understood that all terms used herein are descriptive rather than limiting. Although the invention has been described in conjunction with the specific embodiments set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

What is claimed is:

1. An apparatus for reconditioning fluid of a motor vehicle comprising:
    means for extracting a fluid from a fluid container of the motor vehicle, said means for extracting connectable to a dipstick tube of the fluid container;
    means for reconditioning the fluid, said means for reconditioning connected to said means for extracting for receiving the fluid therefrom, said means for reconditioning including a filter having cellulose and a layer of activated charcoal, said layer of activated charcoal extending from a central portion of said filter to an outer wall of said filter and covering entire area between said central portion and said outer wall, said layer of activated charcoal in direct contact with said cellulose;
    means for discharging the fluid into the fluid container, said means for discharging connectable to the dipstick tube for discharging the fluid therethrough into the fluid container, said means for discharging connected to said means for reconditioning for receiving the fluid therefrom after reconditioning of the fluid.

2. The apparatus of claim 1 wherein said cellulose includes a plurality of layers of cellulose fibers and said layer of activated charcoal situated between said plurality of layers of cellulose.

3. The apparatus of claim 2 wherein said filter includes a cylindrical structure situated in a medial portion of said filter, said cylindrical structure composed of activated charcoal.

4. The apparatus of claim 2 wherein said filter includes a disc situated in a medial portion of said filter, said disc composed of activated charcoal.

5. The apparatus of claim 4 wherein said disc is a film.

6. The apparatus of claim 4 wherein said disc is a mesh.

7. The apparatus of claim 1 wherein said layer of activated charcoal includes activated charcoal pellets, said layer being flat and oriented perpendicular to axis of said filter, said layer situated in a medial portion of said filter.

8. The apparatus of claim 7 wherein said layer of activated charcoal includes an open area at its center for allowing the fluid to pass therethrough.

9. An apparatus for reconditioning fluid of a motor vehicle, comprising:
    an extraction tube for connection to a dipstick tube of a fluid container of the motor vehicle;
    a discharge tube for connection to the dipstick tube, said discharge tube and said extraction tube dimensioned so that they can both together be inserted into said dipstick tube;
    a pump having an inlet and an outlet, said inlet connected to said extraction tube for extracting fluid through the dipstick tube and from the fluid container;
    a reconditioning unit connected to said discharge tube for discharging the fluid therethrough, said reconditioning unit connected to said outlet for receiving the fluid under pressure so that the fluid passes through said reconditioning unit for reconditioning thereof and discharge therefrom into said discharge tube thereby providing reconditioned fluid to the fluid container.

10. The apparatus of claim 9 wherein said extraction tube and said discharge tube are composed of a flexible plastic material.

11. The apparatus of claim 9 wherein said means for reconditioning includes a filter composed of cellulose and activated charcoal, said layer of activated charcoal extending radially from a central portion of said filter to an entire circumferential portion of an outer wall of said filter, said layer of activated charcoal in direct contact with said cellulose.

12. The apparatus of claim 11 wherein said filter includes a cylindrical structure situated in a medial portion of said filter, said cylindrical structure composed of activated charcoal.

13. The apparatus of claim 11 wherein said filter includes a film in the shape of a disc situated in a medial portion of said filter, said disc composed of activated charcoal and said disc thin relative to the thickness of said filter.

14. The apparatus of claim 11 wherein said filter includes a mesh in the shape of a disc situated in a medial portion of said filter, said disc composed of activated charcoal and said disc thin relative to the thickness of said filter.

15. The apparatus of claim 9 wherein said filter includes a layer of activated charcoal pellets extending radially from a central portion of said filter to an entire circumferential portion of an outer wall of said filter and situated in a medial portion of said filter, said layer of activated charcoal pellets having an open area at its center for allowing the fluid to pass therethrough.

16. An apparatus for reconditioning fluid of a motor vehicle, comprising:
    means for reconditioning a fluid in a fluid container of the motor vehicle, said means for reconditioning including a filter composed of cellulose and activated charcoal;
    means for extracting the fluid from the fluid container via a tube thereof and delivering it to said means for reconditioning, said means for extracting and delivering connected to said tube of said fluid container and to said means for reconditioning;
    means for discharging the fluid into said fluid container via said tube, said means for discharging connected to said tube of said means for reconditioning for receiving the fluid therefrom and reconditioning of the fluid, said means for extracting and said means for discharging dimensioned so that they may both together fit inside said tube.

17. The apparatus of claim 16 wherein said filter includes a layer of activated charcoal pellets extending radially from a central portion of said filter to an entire circumferential portion of an outer wall of said filter and situated in a medial portion of said filter, said layer of activated charcoal having an open area at its center to allow the fluid to pass therethrough.

18. The apparatus of claim 16 wherein said filter includes a cylindrical structure situated in a medial portion of said filter, said cylindrical structure composed of activated charcoal.

19. The apparatus of claim 16 wherein said filter includes a disc shaped film situated in a medial portion of said filter, said disc composed of activated charcoal and said disc thin relative to the thickness of said filter.

20. The apparatus of claim 16 wherein said filter includes a disc shaped mesh situated in a medial portion of said filter, said disc composed of activated charcoal and said disc thin relative to the thickness of said filter.

21. An apparatus for reconditioning fluid of a motor vehicle, comprising:

means for extracting a fluid from a fluid container of the motor vehicle, said means for extracting connectable to a dipstick tube of the fluid container;

means for reconditioning the fluid, said means for reconditioning connected to said means for extracting for receiving the fluid therefrom;

means for discharging the fluid into the fluid container, said means for discharging connectable to the dipstick tube for discharging the fluid therethrough into the fluid container, said means for discharging connected to said means for reconditioning for receiving the fluid therefrom after reconditioning of the fluid, said means for extracting and said means for discharging including a bifurcated hose having an extraction passageway and a discharge passageway therein.

22. An apparatus for reconditioning fluid of a motor vehicle, comprising:

means for extracting a fluid from a fluid container of the motor vehicle, said means for extracting connectable to a dipstick tube of the fluid container;

means for reconditioning the fluid, said means for reconditioning connected to said means for extracting for receiving the fluid therefrom;

means for discharging the fluid into the fluid container, said means for discharging connectable to the dipstick tube for discharging the fluid therethrough into the fluid container, said means for discharging connected to said means for reconditioning for receiving the fluid therefrom after reconditioning of the fluid, said means for extracting and said means for discharging including a hose having an extraction passageway orifice and a discharge passageway orifice and the extraction passageway is shorter than the discharge passageway so that the extraction passageway orifice is immersed in the fluid in the fluid container and the discharge passageway orifice is above the fluid in the fluid container when the apparatus is in use.

23. An apparatus for reconditioning fluid of a motor vehicle, comprising:

an extraction tube for connection to a dipstick tube of a fluid container of the motor vehicle;

a discharge tube for connection to the dipstick tube;

a pump having an inlet and an outlet, said inlet connected to said extraction tube for extracting fluid through the dipstick tube and from the fluid container;

a reconditioning unit connected to said discharge tube for discharging the fluid therethrough, said reconditioning unit connected to said outlet for receiving the fluid under pressure so that the fluid passes through said reconditioning unit for reconditioning thereof and discharge therefrom into said discharge tube thereby providing reconditioned fluid to the fluid container, said discharge tube being approximately two feet shorter than said extraction tube so that said extraction tube may be immersed in a body of fluid in the fluid container while said discharge tube is outside of the body of fluid and discharges fluid into a difference area of the fluid container than that were the extraction tube draws the fluid.

* * * * *